United States Patent [19]

Ezaki

[11] 4,292,917
[45] Oct. 6, 1981

[54] PASTRY TOPPING DEPOSITING MACHINE

[76] Inventor: Norio Ezaki, 2-7-33, Kohama-nishi Suminoe-ku, Osaka, Japan

[21] Appl. No.: 138,563

[22] Filed: Apr. 8, 1980

[30] Foreign Application Priority Data

Nov. 1, 1979 [JP] Japan .................. 54-142538

[51] Int. Cl.³ .............................. B05C 5/02
[52] U.S. Cl. ........................ 118/16; 118/25
[58] Field of Search .............. 118/24, 25, 320, 321, 118/409, 16; 198/339, 345, 859

[56] References Cited

U.S. PATENT DOCUMENTS

| | | | |
|---|---|---|---|
| 2,553,191 | 5/1951 | Hettinger | 118/320 X |
| 2,851,986 | 9/1958 | Herschelman | 118/320 X |
| 3,331,354 | 7/1967 | Roland | 118/409 X |
| 3,492,146 | 1/1970 | Kornaker | 118/320 X |
| 3,722,560 | 3/1973 | Morine et al. | 198/339 X |
| 3,724,417 | 4/1973 | MacManus | 118/24 |

Primary Examiner—John P. McIntosh
Attorney, Agent, or Firm—Fisher, Christen & Sabol

[57] ABSTRACT

A machine for automatically depositing whipped cream or other topping material on cakes, or small pastries, includes a pair of whipped cream depositing nozzles mounted on a framework so that they can be adjusted for height and for horizontal spacing between each other. A plate for holding a cake below the nozzles can be raised or lowered as well as revolved so that topping material can be deposited in a ring-shaped pattern. An endless conveyor can be put in place to bring small articles, such as cookies or pastries, into successive positions under the nozzles and the vertical spacing of the nozzles can also be controlled by photo detector means.

9 Claims, 10 Drawing Figures

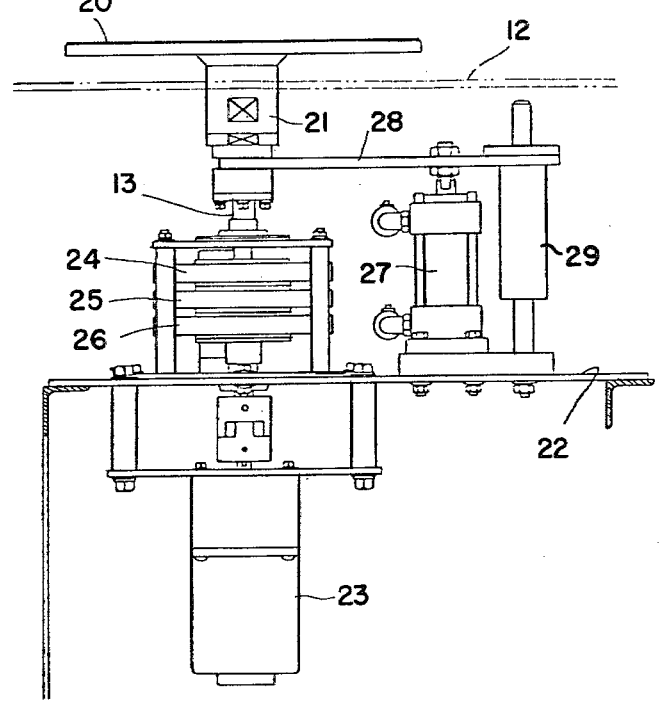
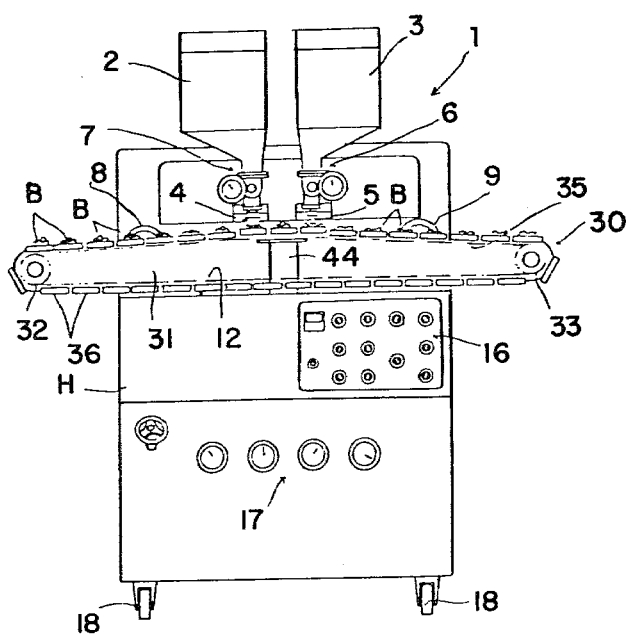
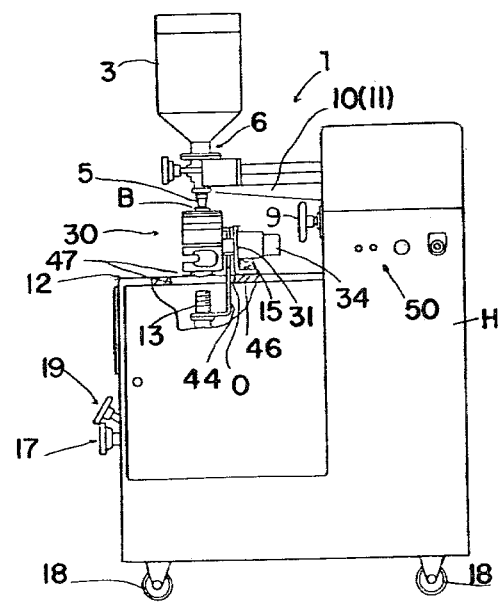

PASTRY TOPPING DEPOSITING MACHINE

BACKGROUND OF THE INVENTION

This invention relates to machines for automatically depositing toppings such as whipped cream or the like in a ring shaped pattern on the tops of cakes as they come from the oven or from a source such as a conveyor.

SUMMARY OF THE INVENTION

One object of the invention is to provide a whipped cream depositing machine which can easily be installed in a conveyor line for placing portions of jam or whipped cream on the tops of successive small bakery products such as waffles or cream puffs.

Another object is to provide a topping depositing machine which can be used either for decorating large cakes carried by rotating cake tables or small cakes moving along a conveyor line.

A further object of the invention is to provide a cake topping depositor for use with successive products of varying heights and which can automatically control the height above the product from which the topping material is dispensed whereby a uniform size of topping is obtained. Hitherto it has not been possible to control the placement of toppings in a ring shaped arrangement due to variations in the thickness of the cakes.

Other objects and advantages will be apparent to those skilled in the art after reading the following specification in connection with the annexed drawings.

BRIEF DESCRIPTION OF THE DRAWINGS

In the drawings,

FIG. 5 is an enlarged elevational view of the rotating cake table mechanism;

FIG. 6 is a front elevation of the machine of FIG. 1, but with a conveyor mechanism included;

FIG. 7 is a side elevation of the machine of FIG. 6;

DESCRIPTION OF A PREFERRED EMBODIMENT OF THE INVENTION

Figure 1:
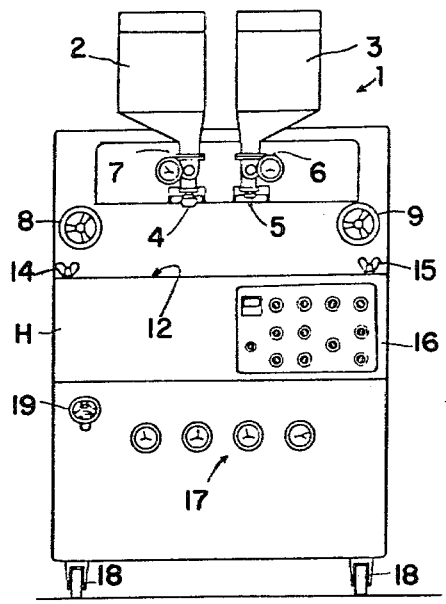
FIG. 1 is a front elevation of a preferred form of pastry topping depositing machine in accordance with this invention.
Figure 2:
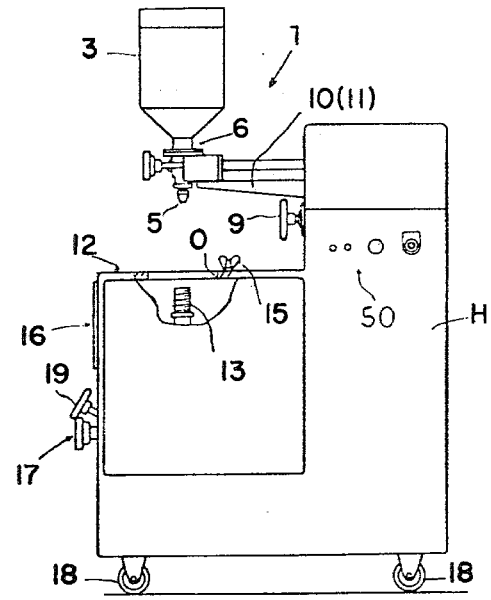
FIG. 2 is a side elevation of the machine of FIG. 1.
Figure 4:
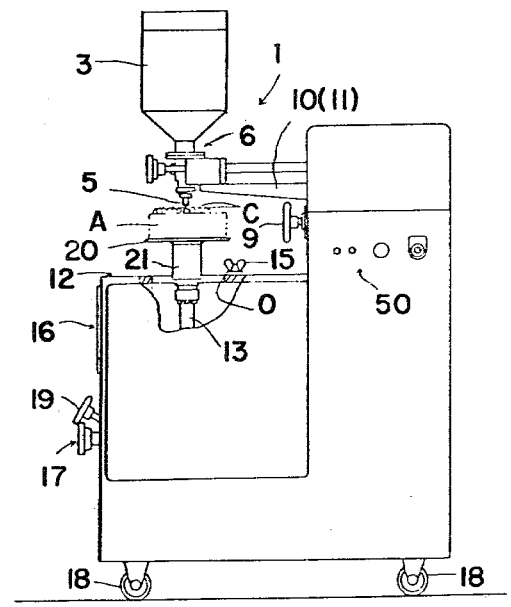
FIG. 4 is a side elevation of the machine of FIG. 3.

As can be seen in FIGS. 1 and 2, the dispensing mechanism, indicated generally by numeral 1 mounted on the top of a cabinet H, may comprise a pair of topping material dispensers including hoppers 2 and 3 to contain whipped cream, or similar material, provided with respective cylinders 7 and 6 for forcing materials from hoppers 2 and 3 to a pair of detachable nozzles 4 and 5 of various cross-sections chosen in accordance with the ornamental shape of deposit desired. These mechanisms are carried by pivotally mounted arms 10 and 11 which are movable in a horizontal direction under the control of operating handles 8 and 9 so that the distance between the nozzles 4 and 5 may be varied. A horizontal base plate 12 covers the cabinet H and is provided with wing nuts 14 and 15 at the opposite ends of the cabinet. A threaded elevating shaft 13 projects upwardly through a suitable opening in the base plate as seen in FIGS. 2 and 4. On the front of the cabinet there are mounted control switches 16, indicator dials 17 and a manually operated handle 19, connected by suitable mechanisms (not shown) for raising and lowering shaft 13. The entire cabinet is mounted on swivelling wheels 18.

Figure 3:
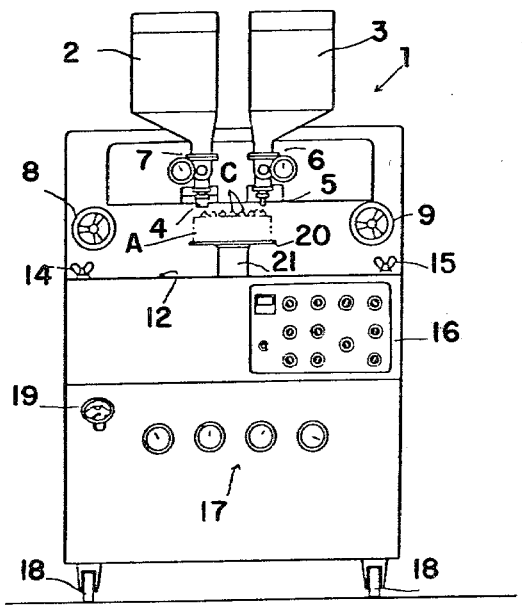
FIG. 3 is a front elevation of the machine of FIG. 1 with a rotating cake supporting table included.

FIGS. 3–5 show an arrangement in which a cake table 20 is utilized to hold a cake, A beneath the nozzles 4 and 5 and to rotate the cake so that a ring shaped ornamental deposit C of topping material will be placed on the upper surface of the cake. The cake table 20 is supported on a pedestal 21 mounted on the upper end of shaft 13 which projects through the opening in cover 12. The shaft 13, with supported cake table 20 is intermittently rotated by a motor 23 having a suitable reduction gearing mounted on framework 22 within the cabinet and the rate of intermittent drive is controlled by selectable cam plates 24, 25 and 26 located below cover 12. These cam plates may cause the table to rotate in steps of, for example, 12, 14 or 16 steps per revolution, a deposit on the cake being made at each step. In order to provide uniform deposits in accordance with differences in the vertical thickness of a cake, the distance between the nozzles 4 and 5 and the top of the cake can be controlled by a vertical air cylinder 27 having a piston supporting arm 28 which is connected to pedestal 21. Also connected to arm 28 is an elastic body 29 which assists in movement of table 20.

Figure 8:
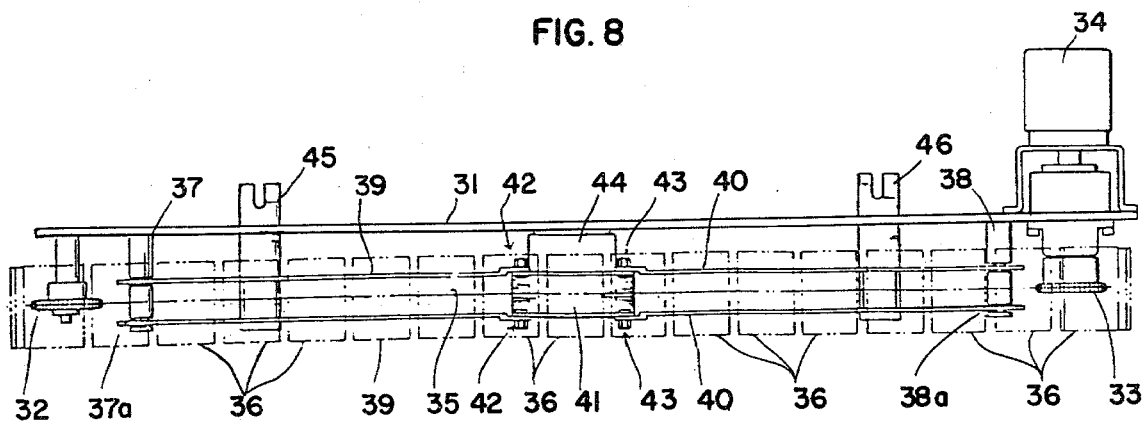
FIG. 8 is an enlarged plan view of the conveyor mechanism.
Figure 9:
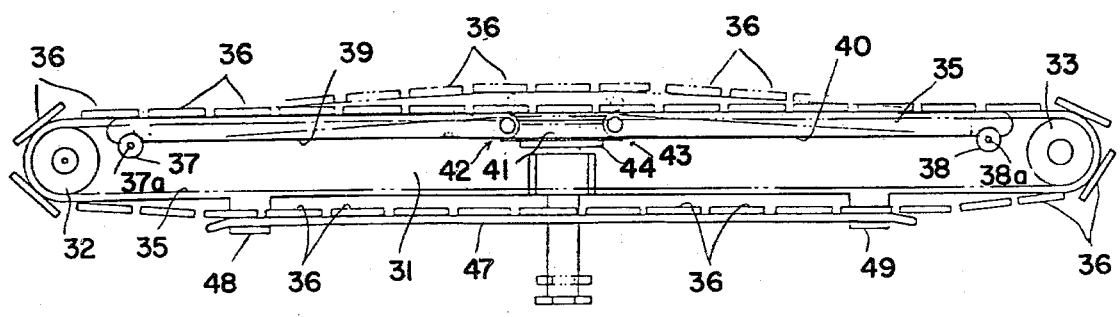
FIG. 9 is a front elevation of the conveyor.

FIGS. 6–9 show an embodiment of the machine in which an endless belt conveyor system, indicated by numeral 30 is utilized. In this case a pair of sprocket wheels 32 and 33 are rotatably mounted on an elongated supporting member 31 as shown in FIGS. 8 and 9. Sprocket wheel 33 is intermittently driven by a motor 34 to intermittently move an endless belt comprised by a series of pivotally joined pastry-supporting plates 36, the other end of the belt being mounted on sprocket wheel 32, whereby small pastries, such as cream puffs are intermittently brought into position successively under the nozzles 4 and 5. Also supported at the ends of member 31 are a pair of forwardly projecting shafts 37a and 38a which respectively support grooved guide rollers 37 and 38. One end of a pair of elongated guide arms 39 ride in the grooves of roller 37 while one end of a similar pair of elongated guide arms 40 ride in the grooves of roller 38. The other ends of arms 39 and 40 are pivotally connected to the four corners of a horizontal connecting plate 41 by means of pivot pins 42 and 43 whereby the plates 36 are carried along on their upper flight of travel on the guide arms 39 and 40 and plate 41. A pusher plate 44 is attached to upper end of shaft 13 so that it bears against the lower surface of connecting plate 41 so that when the air cylinder 27 raises the arm 28 it also raises plate 44 and the connecting plate 41 above it. This, of course, elevates the inner ends of guide arms 39 and 40 to bring the individual conveyor plates 36 into the correct distance below nozzles 4 and 5 in accordance with the height of the pastries being carried by the conveyor. A pair of horizontal mounting brackets 45 and 46 are attached to member 31 to allow the entire assembly to be detachably mounted on the cabinet of the dispensing machine by means of the wing nuts 14 and 15. Another pair of forwardly projecting arms 48 and 49 are attached to member 31 to support the elongated guide 47 upon which the conveyor plates 36 ride during the passage along the lower flight path when returning to the input end to receive further articles.

In this manner, when it is desired to dispense portions of whipped cream, or other food product, C on the top of a cake A in a ring shaped decorative arrangement the cake plate 20 is installed with the plate 21 on top of shaft 13. The horizontal positions of the nozzles 4 and 5 are then adjusted by means of handles 8 and 9 to dispense the cream portions at the correct locations on the cake. The vertical position of the cake can be adjusted either by actuation of the air cylinder 27 under control of switch panel 16, or manually by means of handle 19 so that the top of the cake will be located at the correct distance below nozzles 4 and 5. The final vertical positioning of the nozzles can be determined automatically by the mechanism identified generally by numeral 62 in FIG. 10. The cake table 20 is then rotated intermittently by motor 23 depending upon which of the cam plates 24, 25, or 26 has been selected for use and the portions of filling are deposited in a circular pattern on the cake.

When the machine is being used to decorate small pastries, cookies, etc. then the conveyor 30 is installed on the base plate 12 of the cabinet by securing the bracket 45 and 46 under the wing nuts 14 and 15. The lower part of pusher plate 44 is attached to elevating shaft 13 to regulate the vertical position of connecting plate 41. The electrical circuit for driving motor 34 for the conveyor is plugged into an outlet provided on the side of cabinet H.

When the air cylinder 27 is operated by control panel switches 16 the shaft 13 is raised by arm 28 and the pusher plate 44, mounted on this shaft, raises the connecting plate 41 to move the plates 36 of the conveyor closer to the nozzles 4 and 5. The conveyor 30 is then operated intermittently by motor 34 to bring successive pairs of pastries B under the nozzles 4 and 5 for successive deposits of cream filling, etc.

Figure 10:
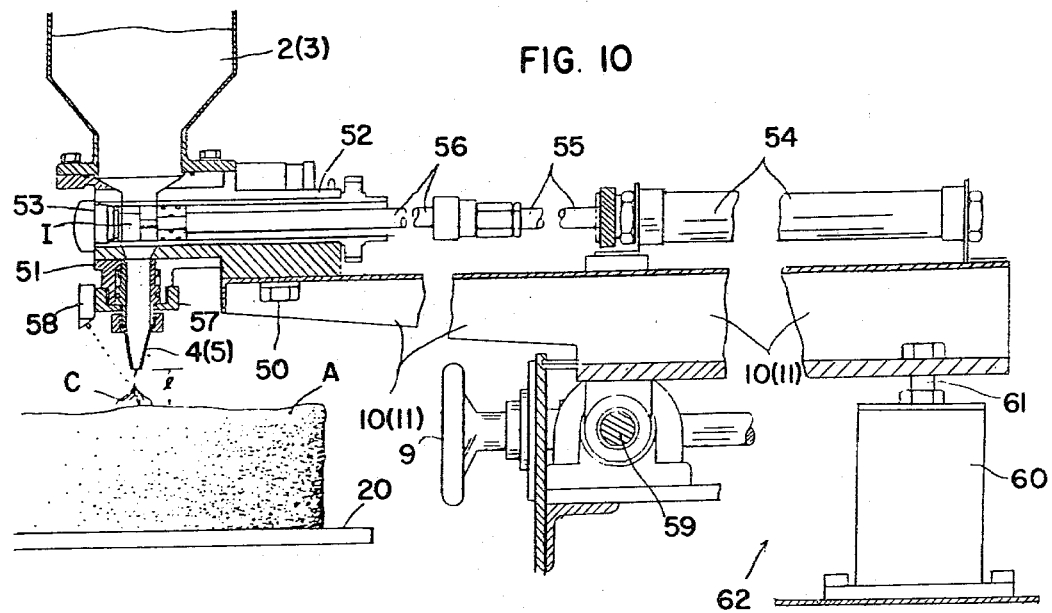
FIG. 10 is an enlarged vertical sectional view of a depositing head.

The dispensing mechanism designated by numeral 1 in FIGS. 1-4, is shown in detail in FIG. 10, wherein a horizontal cylindrical body 52 is supported at the ends of arms 10 and 11 by means of bolts 50, the respective hoppers 2 and 3 being mounted by flange 51 on the body 52. A piston 53 in cylinder 52 is connected by a rod 56 to a piston rod 55 of an air cylinder 54 mounted on each arm 10 and 11 for reciprocating the piston 53 in response to operation of air cylinder 54, whereby material in the hoppers will be deposited on individual pastries from nozzles 4 and 5 in the form of individual portions C.

In addition, a photo-electric detector means 58 is mounted on the fixture holding nozzles 4 and 5 for detecting the distance between the upper surface of a cake A when on the table 20 and the lower end of the nozzles. Each of the arms 10 and 11, supporting the nozzles 4 and 5 and associated devices, is pivotally mounted at a medial location on a shaft 59. The rear ends of arms 10 and 11 are also connected to an air cylinder 60 by means of a rod 61 so that the elevation of a nozzle 4 or 5 can be controlled by rotation of an arm 10 or 11 about a shaft 59 by actuation of air cylinder 60. This operation of an air cylinder 60 can be controlled by means of electrical circuits well known in the art, by the photoelectric detector means 58 to automatically maintain the correct distance between a nozzle and the upper surface of a cake. In the alternative, the relative vertical position of the connecting plate 41 on the conveyor system 30 can be automatically maintained by use of appropriate electrical control circuitry between detector means 58 and air cylinder 27.

I claim:

1. In a machine for automatically dispensing pastry topping materials to the top surfaces of successive articles of cake or pastry comprising nozzle means for intermittently depositing portions of pastry topping material, pastry supporting means for supporting cakes underneath said nozzle means to deposit successive portions of said topping material on said cakes, said pastry supporting means including first support means for depositing topping on cakes in a circular pattern and also including second support means for conveying successive pastries underneath said nozzle means to deposit successive portions of said topping material on successive pastries, said first support means including vertically movable and selectively rotatable cake supporting plate means and said second support means including pastry supporting endless conveyor means, and shaft means selectively coacting with said cake supporting plate means for controlling the vertical distance between a cake and the nozzle means and for rotating the cake under the nozzle means, said shaft means selectively coacting alternatively with said endless conveyor means to control the distance between the nozzle means and successive pastries positioned under the nozzle means.

2. Automatic pastry topping machine as defined in claim 1, wherein said nozzle means and shaft means are mounted on frame means, and said pastry supporting conveying means comprises an elongated supporting element removably mounted on said frame means, sprocket means mounted at the opposite ends of said element, endless belt means carried by said sprockets and guide means mounted on said element for relative vertical displacement by said shaft means with respect to said sprocket means for varying the vertical distance between a medial portion of said belt means and said nozzle means.

3. Automatic pastry topping machine as defined in claim 2, wherein said belt means comprises a series of pivotally linked pastry supporting plates movable in one direction between the sprocket means in an upper flight path, said guide means comprising support plate means to be removably mounted on said vertically movable shaft means to position successive pastry supporting plates at a predetermined elevation at said medial portion of the belt means.

4. Automatic pastry topping machine as defined in claim 3, wherein said sprocket means are mounted in fixedly positioned bearings and said guide means includes at least two guide arms pivotally connected to said support plate means and extending in respective opposite directions away from the plate means to support the pastry supporting plates during movement in said upper flight path, and means for movably supporting the free ends of the guide arms to allow for adjustment of the vertical elevation of the support plate means.

5. Automatic pastry topping machine as defined in claim 4, wherein said means for supporting the free ends of the guide arms comprises roller means mounted on said elongated supporting element.

6. Automatic pastry topping machine as defined in claim 5, wherein said roller means includes a cylindrical roller body mounted for rotation about a horizontal axis transverse to the direction of said upper flight path, said roller body being provided with an exterior annular groove, the free end of a guide arm being received in rolling contact within said groove.

7. Automatic pastry machine as defined in claim 1, wherein said shaft means includes a plurality of cam plate means for selectively controlling the rotation of the cake supporting plate means in intermittent steps.

8. Automatic pastry machine as defined in any one of claims 1, 2, 3, 4, 5, 6 or 7, wherein said nozzle means includes radiant energy sensing means for controlling the vertical distance between the nozzle means and a cake or pastry.

9. Automatic pastry machine as defined in claim 8 wherein said sensing means includes a source of light and photoelectric means responsive to light reflected from said source.

* * * * *